Sept. 30, 1958     R. E. SELTZER     2,853,885
SHAFT DRIVING ARRANGEMENT
Original Filed April 15, 1952     2 Sheets-Sheet 1
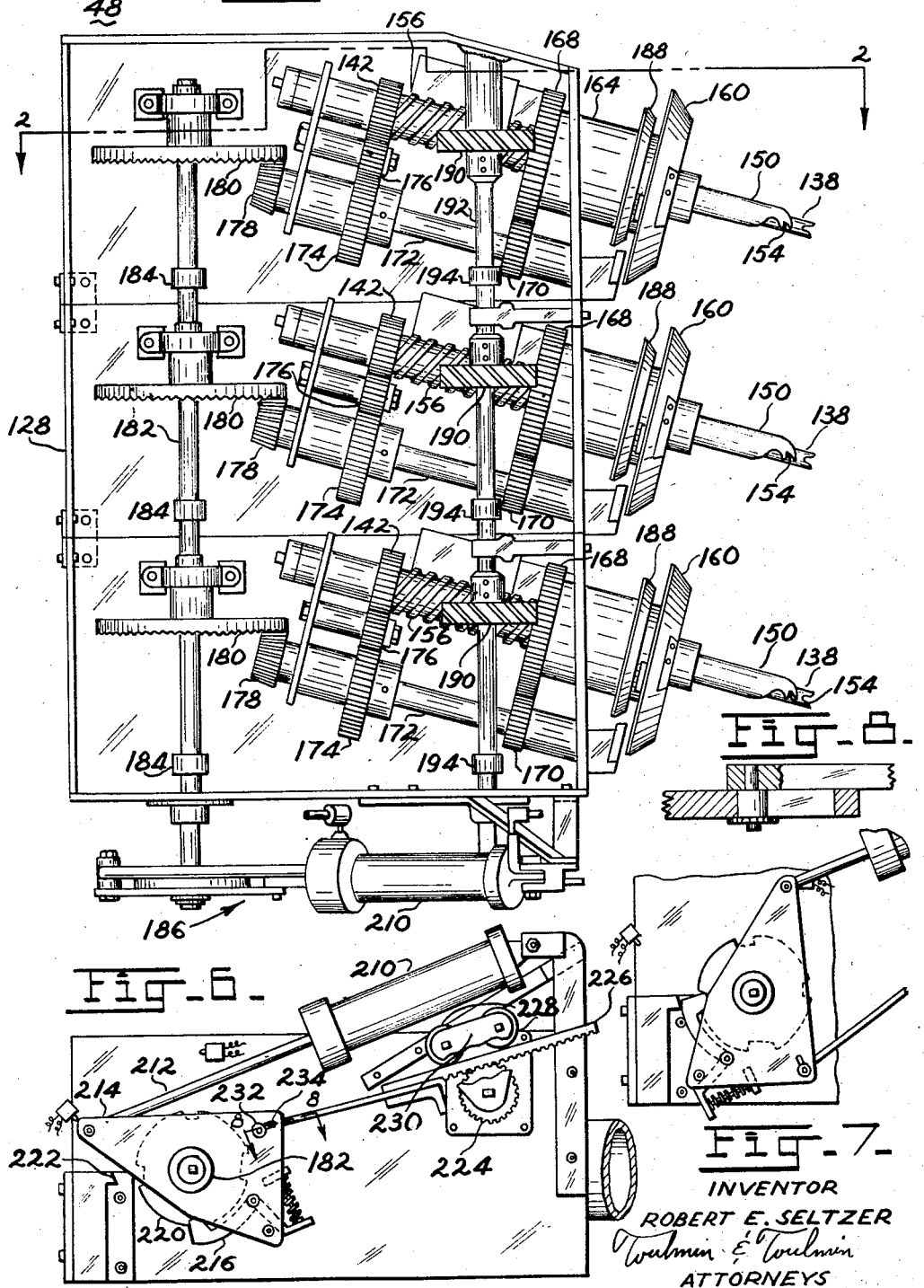
INVENTOR
ROBERT E. SELTZER
Toulmin & Toulmin
ATTORNEYS

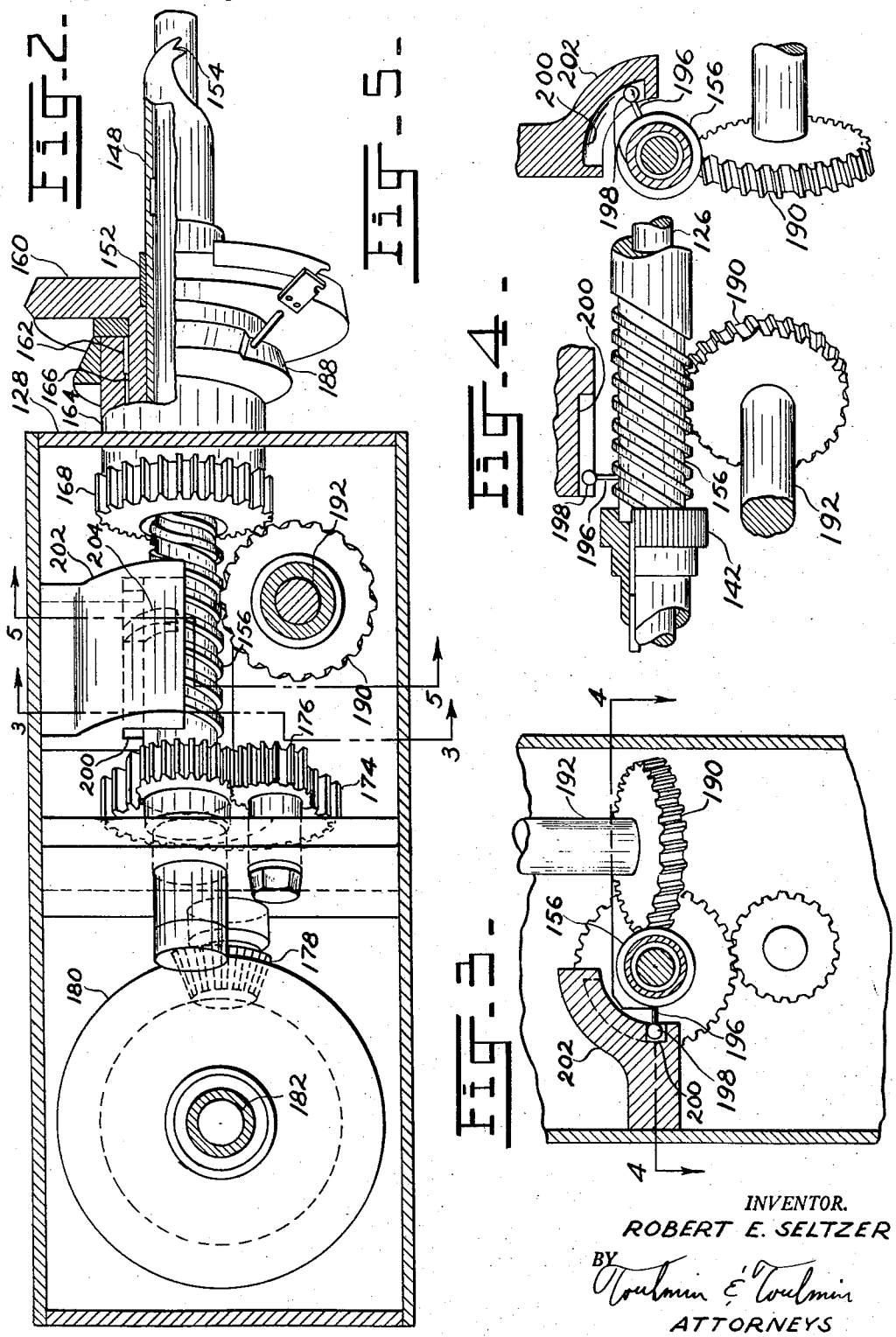

United States Patent Office 2,853,885
Patented Sept. 30, 1958

2,853,885

SHAFT DRIVING ARRANGEMENT

Robert E. Seltzer, Bellevue, Ohio, assignor to The American Baler Company, Bellevue, Ohio, a corporation of Ohio Original application April 15, 1952, Serial No. 282,429. Divided and this application April 14, 1954, Serial No. 423,060

2 Claims. (Cl. 74—128)

The present invention relates to automatic baling machines and the like, and more particularly to a shaft-driving arrangement for a twisting unit peculiarly adapted for use in a baling machine.

This application is a division of the copending application filed April 15, 1952, and having the Patent Number 2,768,574.

Most baling devices will automatically form a bale to a predetermined size, but the banding of the bale and the tying of the cord or wires employed for banding has heretofore been accomplished manually. Carrying out this operation manually is not only somewhat slow but requires considerable labor, and, as a result, balers, particularly commercial balers for baling paper and industrial wastes, have never been operated on as rapid and economical a cycle as was desired.

While various shaft-driving arrangements have been proposed in the past, there has been a tendency among these arrangements to be rather cumbersome and complicated in structure. The present invention discloses a compact and efficient shaft-driving arrangement for a twister unit to be used in an automatic baler machine. As a bale is being built up in the baling machine, banding wires are extended around three sides of the bale. When the bale has been completed, the wires are pushed across the back end of the bale and the twister unit disclosed as this invention operates to cut off the thrust-across wire, to clamp the end of the wire leading to the supply wheel, to twist together the two ends of the wires passing around the bale, and to tuck the cut-off ends of the wire into the corner of the bale. After the completion of the twisting operation, the mechanism of the twister unit reverts to a rest position where it remains while the machine builds up a new bale.

The twister unit disclosed as this invention essentially comprises a slotted rod which is referred to as the twister rod, a sleeve reciprocable and rotatable on the rod and having a notched end part which is the tucker sleeve, and a rotatable cut-off and transfer plate which consists of means for severing the baling wire and for gripping the end thereof. In addition, the unit has gearing and drive mechanism to operate the components of the unit in proper relationship to accomplish the operations as listed in the foregoing.

It is, therefore, the principal object of this invention to provide an improved shaft-driving arrangement for a twister unit to be used in a baler machine.

It is another object of this invention to provide a device for twisting the wires with which a bale is banded, so that while the wires are twisted tightly there is no tendency for the wires to stick on the twisting device.

It is a further object of this invention to provide a device for twisting the wires with which a bale is banded so that no jagged ends are left projecting from the bale.

Other objects and advantages will become apparent upon reference to the following description when taken in conjunction with the following drawings in which:

Figure 1 is a side elevational view of a twister unit constructed in accordance with this invention, with a side wall of the main frame removed;

Figure 2 is a sectional view taken along the line 2—2 of Figure 1;

Figure 3 is a sectional view taken along the line 3—3 of Figure 2;

Figure 4 is a sectional view taken along the line 4—4 of Figure 3;

Figure 5 is a sectional view taken along the line 5—5 of Figure 2;

Figure 6 is a bottom plan view of the twister unit illustrated in Figure 1, showing in detail the drive mechanism therefor;

Figure 7 is a partial bottom elevational view of the twister unit illustrated in Figure 1, showing the drive mechanism in position after the twister unit has completed its operation; and Figure 8 is a sectional view taken along the line 8—8 of Figure 6.

Returning now to the drawings, more particularly to Figure 1, wherein like reference characters indicate the same parts throughout the various views, 48 indicates generally a wire-twisting unit disclosed as this invention. The unit as disclosed herein comprises three separate cut-off and twister units mounted in a single frame and commonly driven.

The twisting unit 48 comprises a frame 128 which, as is most clearly illustrated in Figure 1, comprises three superimposed sections, associated with each of which is a complete twister and cut-off unit. The arrangement of the twister unit in sections permits the use of as many thereof as may be necessary. In the machine illustrated in the drawings, three twister units are employed, but in other instances, more or fewer might be required and the sectionalized construction illustrated is important for this reason.

Referring to the twisting mechanism proper associated with each section of the twisting units, reference may be made to Figures 1 through 7, wherein it will be seen that each of the said sections comprises a central rod 138 having its end adjacent the baling machine slotted and at its other end carrying a pinion 142. Means such as the bearings 148 and additional bearings not shown in the drawings rotatably support rod 138.

Surrounding rod 138 is a sleeve 150 reciprocable and rotatable in bearings 152 and having a projecting hook-like end part 154. Sleeve 150 is formed with an integral helical gear portion 15, and adjacent this portion is a bearing between the sleeve and rod 138.

Rotatably mounted about sleeve 150 is a larger sleeve member 166 which is journaled in bearings 162 within a still larger sleeve member 164 that is rigidly mounted in the adjacent wall of frame 128. At its outer end sleeve part 166 carries the rotary cut-off and transfer plate 160 which is for the purpose of gripping the end of the baling wire and also for cutting off the banding wire during a tying operation. At its other end, sleeve 166 carries a gear 168 which meshes with a gear 170 pinned to a shaft 172 that is journaled in frame 128. Shaft 172 also mounts a gear 174 that drives through an idler 176 into pinion 142 that is pinned to rod 138.

Shaft 172 carries at its extreme inner end a bevel gear 178 that meshes with a main driving bevel gear 180.

As will be seen in Figure 1, the bevel driving gears 180 of the three sections of the twister unit are mounted on a common vertical shaft 182 having couplings 184 for connecting the various sections of the unit together, and at its bottom end shaft 182 is adapted for being driven by a driving unit, generally indicated by numeral 186.

Returning to Figure 1, the outer end of stationary sleeve 164 for each section of the twister unit comprises a cam 188, the purpose of which is to actuate the wire gripping elements carried by the rotary cut-off and transfer plate adjacent thereto.

The helical gear portions 156 of the several tucker sleeves 150 are each engaged by a corresponding helical gear 190 arranged on a vertically extending drive shaft 192 provided with couplings 194 in the manner and for the reason already described in connection with shaft 182 and couplings 184 therefor. The extreme lower end of shaft 192 extends into the drive 186 at the bottom of the unit.

The previously mentioned helical gear 156 is availed of for giving the associated tucker sleeve first a reciprocatory and then a rotary movement by associating with the said helical gear a pin 196 having a head 198 that extends into a slot 200 cut longitudinally in a block 202 carried by frame 128. At the extreme right end of slot 200 there is a circumferentially extending slot portion 204, as illustrated in Figures 3, 4, and 5. It will be apparent that rotation of the helical gears 190 will first cause axial movement of the associated sleeves 150 until the heads 198 of the pins 196 bottom at the right ends of slots 200, and thereafter further rotation of the helical gears 190 will cause rotation of the said sleeves with the heads of the said pins moving along the circumferential slots 204.

The drive mechanism to operate the twister unit is indicated at 186 and is mounted on the bottom of the twister unit. The mechanism is best illustrated in Figures 1 and 6 and comprises a hydraulic cylinder 210 having a plunger 212 extending therefrom which is connected with a plate 214 rotatably mounted on the lower end of shaft 182. Plate 214 has pivoted thereto a pawl 216 adapted for engaging notches in the periphery of a cam plate 220 fixed on shaft 182. The pawl 216 is shaped to drive the cam plate positively in a clockwise direction in Figure 6 but to be inoperative with respect to the cam plate when moving counterclockwise.

As will be seen hereinafter, it is desirable after the twister rods have been driven in rotation to twist the wires together, to back the said rods up at least a slight amount to release the twisted wires therefrom, and for this reason there is provided a stop member 222 positioned for engaging pawl 216 at a predetermined point during its forward or clockwise motion, so that thereafter, when the drive is reversed, a predetermined amount of counterclockwise motion of the pawl and cam plate 220 will occur before pawl 216 moves out from beneath stop 222 and releases the cam plate.

As will be more apparent hereinafter, it is desirable for the actuation of the twister rods to be in advance of the actuation of the tucker sleeves, and for this reason means are provided in the drive arrangement whereby the actuation of the tucker sleeves is delayed. This arrangement takes the following form:

The lower end of shaft 192 is provided with a gear 224 that meshes with a rack 226. The rack is held in engagement with the gear by rollers 228 carried on a plate 230 pivotally connected with the lower end of shaft 192. The rack is connected by means of a pin 232 and slot 234 with plate 214. Slot 234 is so located and extends in such a direction that plate 214 will move through a substantial angle in the clockwise direction before the rack will be picked up and moved to actuate the tucker sleeves. In this manner the twisting of the wires will commence before there is any actuation of the tucker sleeves.

As will be seen, the sleeve 166 is geared directly together with its associated twister rod, and rotation of sleeve 166 and its connected cut-off and transfer plate will thus commence as soon as rotation of the associated twister rod commences.

During the course of the above description, it is noted that the operation of the various mechanisms comprising the twister unit was described in detail. It is further pointed out that the operation of the twister unit as a whole is integrated with that of the baling machine by means of an electronic circuit. When a bale has been built up within the machine, the banding wires are driven across the back end of the bale. The twisting unit 48 is then moved lengthwise of the baling machine to bring the notched ends of the twister rods into engagement with the wire passing around the bale at the point where the wire crosses itself. By means of suitable relays and circuitry, the drive for the twister unit will be actuated. This will result in the rotation of the twister rods to twist the ends of the wire together and at the same time suitable mechanism will provide that the banding wires will be released from the needles which drove the banding wires across the back of the bale. The banding wires will also be sheared off and the tucker sleeve will be axially moved by means of a mechanism hereinbefore described in order to drive the sheared ends of the banding wires into the bale itself. At this point the hydraulic cylinder 210 of the drive mechanism will again be actuated by suitable relays and will cause the drive mechanism to return to its retracted position. Thus the cycle of operation of the twister unit is completed.

Thus it can be seen that the present invention describes an improved shaft-driving arrangement for a twisting unit which is compact and simple in structure. Furthermore, the twisting unit as disclosed in this invention is adapted for being associated with substantially conventional baling devices by suitably mounting the twisting units thereon.

It will be understood that this invention is susceptible to modification in order to adapt it to different usages and conditions, and accordingly it is desired to comprehend such modifications within this invention as may fall within the scope of the appended claims.

What is claimed as this invention is:

1. A drive arrangement for a device of the nature described comprising: a reciprocable plunger, a plate rotatable on the axis of the shaft to be driven connected to the plunger, a ratchet wheel fixed to the shaft adjacent the plate, a pawl on the plate to engage the notches in the wheel to drive the shaft in one direction, and means to engage the pawl adjacent the limit of the advancing movement of the shaft to lock the pawl to the ratchet wheel whereby the advancing movement of the shaft is followed by a lesser amount of movement in the opposite direction.

2. A drive arrangement for a device of the nature described comprising: a reciprocable plunger, a plate rotatable on the axis of the shaft to be driven connected to the plunger, a ratchet wheel fixed to the shaft adjacent the plate, a pawl on the plate to engage the notches in the wheel to drive the shaft in one direction, means to engage the pawl adjacent the limit of the advancing movement of the shaft to lock the pawl to the ratchet wheel whereby the advancing movement of the shaft is followed by a lesser amount of movement in the opposite direction, a second shaft to be actuated, a gear on the second shaft, a rack meshing with the gear, and a lost motion connection between the plate and rack so actuation of the first shaft precedes actuation of the second shaft.

References Cited in the file of this patent
UNITED STATES PATENTS

| | | |
|---|---|---|
| 1,094,627 | Bancroft et al. | Apr. 28, 1914 |
| 1,621,588 | Hintz | Mar. 22, 1927 |
| 1,697,890 | Vaughn | Jan. 8, 1929 |
| 2,206,299 | Dunn et al. | July 2, 1940 |
| 2,609,698 | Patzer | Sept. 9, 1952 |
| 2,674,181 | Jones | Apr. 6, 1954 |